Jan. 25, 1955  W. C. VIZARD  2,700,231
BEADED SHOE WELTING
Filed Aug. 11, 1953
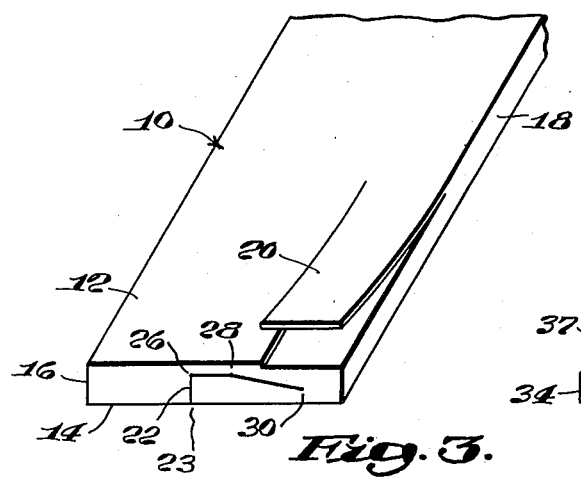
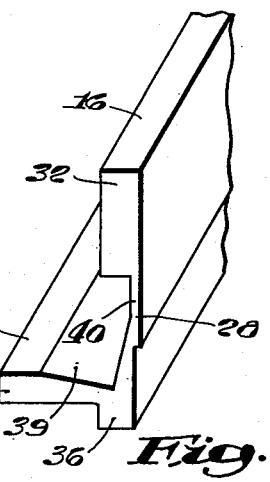
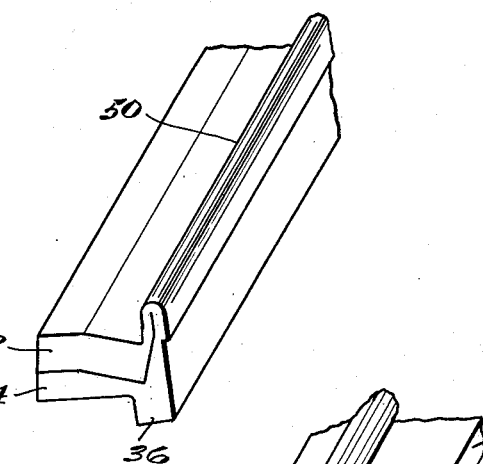
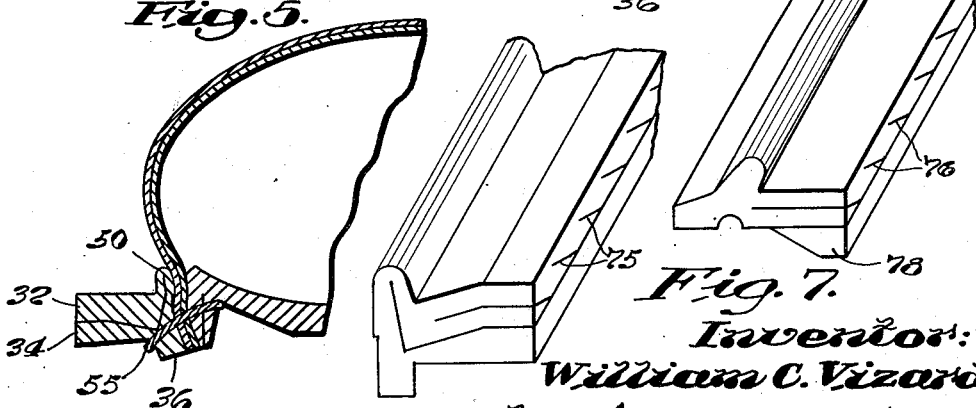
Inventor:
William C. Vizard,
By J. Stanley Churchill
Attorney

United States Patent Office 2,700,231
Patented Jan. 25, 1955

2,700,231

BEADED SHOE WELTING

William C. Vizard, Brockton, Mass., assignor to Barbour Welting Company, Brockton, Mass.

Application August 11, 1953, Serial No. 373,519

1 Claim. (Cl. 36—78)

This invention relates to a beaded shoe welting.

One object of the present invention is to provide a novel and improved beaded welt having an inseam flange and a welt extension with a bead upstanding from the surface of the welt intermediate the inseam flange and welt extension, and wherein the welt extension is made substantially thicker than the thickness of the inseam flange.

Another object of the invention is to provide a novel and improved beaded shoe welt having a two-piece and preferably relatively thick welt extension which may be formed from a single strip of welt stock, and preferably from a single grain leather fillet, in a novel, economical and simple manner.

A further object of the invention is to provide a beaded welt having a relatively thick welt extension and in which the exposed surfaces of the bead and welt extension comprise the grain surface of the fillet which may be highly polished and/or decorated to impart to the shoe embodying the welt an attractive appearance.

With these general objects in view and such others as may hereinafter appear, the invention consists in the novel and improved welt hereinafter described and particularly defined in the claim at the end of the specification.

In the drawings for purposes of illustration I have shown in perspective in Figs. 1 to 4 the different positions occupied by the welt forming strip and preferably the grain fillet during the successive steps in the operation of the cutting, folding and molding the welt forming strip into finished form;

Fig. 5 is a sectional detail showing the improved welt sewn into the shoe;

Fig. 6 is a perspective of a modified form of welt shown in Fig. 4 with a novel and relatively thick laminated welt extension; and Fig. 7 is another form of welt having a novel and relatively thick laminated welt extension.

In general the present invention contemplates in its preferred form a novel beaded welt having a welt extension of substantially greater thickness than the thickness of the inseam flange, and preferably a two-piece welt extension, and having a downwardly and angularly extended inseam flange and a bead extending from the surface of the welt extension intermediate the inseam flange and welt extensions and preferably at the inner side thereof. In one form of the present welt the bead is formed by a folded portion connecting the inseam lip and the upper unit of the two-unit welt extension. Preferably, the welt extension is of substantially greater thickness than the thickness of the inseam lip and of the thickness of the leather fillet or strip of welting stock from which the novel welt may be made.

In another aspect the invention contemplates the provision of a novel form of relatively thick laminated welt extension whereby during the stitching of the welting around the toe portion of the shoe maximum flexibility is imparted to the welt extension in order to overcome any tendency of the welt to delaminate or of the lower lamina of the welt extension to draw under the upper section of the welt extension in going around the toe portion of the shoe.

In accordance with the preferred method of manufacture the welt may be formed by cutting vertically from the underside of the strip or fillet at near the central portion thereof, and this cut extends to a point a short distance from the upper surface of the welt. From this point a short cut is made in a direction substantially parallel to the upper surface of the welt and thence at a slight downward angle to a point spaced from the side edge of the fillet sufficient to leave an uncut inseam lip forming portion. With this construction the single fillet or strip of welt stock may then be folded so that the relatively thin connecting portion of the strip disposed above the horizontal and downwardly inclined cut above referred to may be utilized to form a folded bead. Then the portion of the stock below the aforesaid horizontal and downwardly inclined cuts may be disposed to underlie the uncut marginal portion which is to form the upper unit of the two-unit welt extension. The contacting surfaces are cemented and molded to form the finished welt.

The downwardly inclined surface formed by the downwardly inclined cut assists in enabling the molding and pressing operations to cause the inseam lip forming portion to extend inwardly at a slight angle from the vertical so that when the welt is stitched to the usual lips depending from the insole, the bead is caused to hug the vamp tightly and to press it against the margin of the insole.

Referring now to the drawings, 10 represents a grain leather fillet which is preferably about 1 inch in width and 5/32 inch in thickness and from which the finished welt may be fabricated. The fillet is of rectangular shape having an upper grain surface 12 and a lower flesh surface 14. The marginal side edges 16, 18 are cut square with relation to the plane of the upper and lower surfaces.

In accordance with the present invention a relatively thin strip 20 of the grain surface 12 is rabbeted therefrom in order to relieve the tension on such surface during the inseam stitching and to assist in permitting the fillet 10 to be bent or folded in the manner hereinafter to be described.

An incision 22 is made in the lower flesh surface 14 of the fillet 10 at point 23, about 13/32 of an inch from the marginal side edge 16. The incision 22 is extended upwardly in a substantially vertical direction to point 26 located about 1/8 of an inch below grain surface 12, continuing from said point in a direction substantially parallel to grain surface 12, toward marginal side edge 18 for about 5/32 of an inch to point 28, then is continued at a gradually downwardly tapered angle to point 30 about 5/32 of an inch from marginal edge 18 and substantially midway between rabbeted grain section 20 and the lower flesh surface 14 of the fillet.

It will be observed that the incision 22 divides the fillet 10 into upper and lower sections 32, 34 integrally joined together by the uncut marginal inseam lip forming portion 36. The portion of the upper section 32 adjacent the side edge 16 constitutes the upper unit of the two-unit welt extension, and such portion is connected by a central section 40 to the inseam lip forming portion 36. The lower section 34 is thus formed with a flat surface 37 parallel to the upper and lower surfaces of the welt extension and with a downwardly inclined surface 39.

After the cutting operations have been completed, as described, the upper section 32 is folded upwardly until it is in a position substantially at right angles to the lower section 34, as shown in Fig. 2. The marginal side edge 18 is thus moved during the folding operation through substantially 90°, and the inseam lip forming portion 36 projects downwardly, as shown in Fig. 2.

The next step in the folding operation is shown in Fig. 3 wherein the central section 40 is folded about a line corresponding to the point 28 to thereby form the bead 50 and to dispose the upper and lower units which are to form the two-piece welt extension in the position illustrated in Fig. 3. The surfaces to be brought into contact will be coated with a suitable cement, and the partially completed welt is then passed through a known form of molding and pressing apparatus where the welt is converted from the form shown in Fig. 3 to that shown in Fig. 4.

When the completed welt is sewn into the shoe as shown in Fig. 5, the inseam stitches 55 are passed through the inseam lip from the corner formed between the adjacent surfaces of the inseam lip and undersurface of the two-unit welt extension.

While it is preferred to produce the present welt from a grained surface leather fillet in the manner above described and as herein illustrated, it will be understood that in its broader aspects the invention contemplates structure of beaded welt wherein the welt extension is substantially thicker than the inseam flange. This structure may be produced of plastic by suitable molding and folding operations or the structure may be of plastic extruded into the final shape.

In Fig. 6 I have illustrated a modified form of the welt shown in Fig. 4 wherein provision is made for curing, or at least reducing to a minimum, any tendency of the cemented joint between the laminated sections of the welt extension to break away and the laminations to separate from one another or for the undersection to draw under the upper section and consequently narrow the welt edge. As illustrated in Fig. 6, the flesh surface of the upper section of the welt edge is slashed at intervals 75 along the length thereof to form slashed sections. After such slashing operation the upper section is cemented to the lower section in the manner previously described. This has been found to cure any tendency of the cemented joint to break during the inseaming of the welt around the toe portion of the shoe.

In the modification of the invention illustrated in Fig. 7 the modified form of welt having a bead and an inseam flange is formed with a relatively thick laminated welt extension by first slashing as at 76 the under or flesh surface of the upper section of the welt extension and thereafter cementing thereto the wedge shaped strip 78 of stock to the under slashed surface of the welt extension and forming the relatively thick welt extension shown in Fig. 7.

From the description above, it will be observed that the upper exposed surface of the welt extension and the bead comprise portions of the grain surface 12 of the leather fillet and may be highly polished and/or decorated, either in one or different colors, imparting to the shoe an attractive appearance.

The present construction of the beaded welt enables the welt to be produced in a simple, economical and efficient manner, and the welt is attractive, imparting to the shoe substantial eye appeal.

Having thus described the invention, what is claimed is:

A one-piece beaded shoe welt comprising, a laterally extending welt extension portion, an upstanding bead along one edge of said extension portion, an inseam flange extending generally downwardly at said one edge below said bead, the outer edge of said bead, said one edge and the outer face of said inseam flange defining a surface extending downwardly and outwardly at an oblique angle to the median plane of said extension portion, said surface being undercut to define a longitudinally extending ridge below the top of said bead, the outer edge of said bead above said ridge extending outwardly beyond the portion of said surface below said ridge.

References Cited in the file of this patent

UNITED STATES PATENTS

| Number | Name | Date |
|---|---|---|
| 1,664,891 | Lyon | Apr. 3, 1928 |
| 1,732,807 | Gilson | Oct. 22, 1929 |
| 1,996,844 | Vizard | Apr. 9, 1935 |
| 2,140,047 | Brown | Dec. 13, 1938 |
| 2,207,068 | Plummer | July 9, 1940 |
| 2,299,516 | Vizard | Oct. 20, 1942 |